Patented Apr. 25, 1950

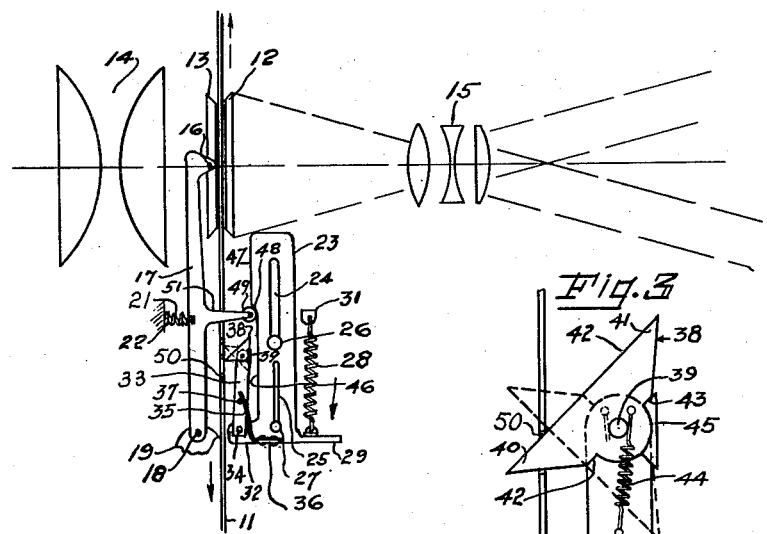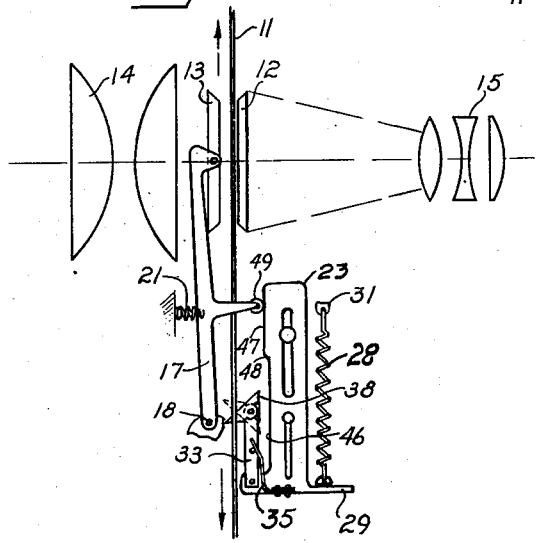

2,505,016

UNITED STATES PATENT OFFICE 2,505,016

REVERSIBLE SLIDE FILM FEED

Jan A. Van den Broek, Ann Arbor, Mich., assignor to Argus, Incorporated, Ann Arbor, Mich., a corporation of Michigan Application March 6, 1947, Serial No. 732,794

8 Claims. (Cl. 88—18.4)

This invention relates to means for feeding a strip of film bearing pictures or other data through a projection or like apparatus and is more particularly concerned with such mechanism wherein a reversible slide feed is employed for moving the film in either direction at the will of the operator, correlated with a suitable arrangement for holding the film flat at the projection aperture during projection and releasing it for movement during the feed operation.

Slide feeds for picture strips correlated with means for opening a film gate when the film is to be advanced have been heretofore provided, but to my knowledge none of these in practical use are capable of reversing movement of the film while retaining synchronous association with the pressure plate operating means. My present invention embodies a distinct and useful advantage over such apparatus in that, for example, a lecturer using a lantern containing my novel slide film apparatus may reverse the feed of the film at any time in order to go back to a picture for reference purposes.

It is a major object of my invention therefore to provide a novel reversible film slide feed mechanism correlated with means for holding the film at a projection or like aperture which is released synchronously and automatically to permit movement of the film in either direction.

Other objects of the invention will presently appear as the description proceeds in connection with the appended claims and the annexed drawings, wherein:

Figure 1 is a diagrammatic view in side elevation of a film slide feed mechanism according to a preferred embodiment of the invention, which is reversible as indicated by the full and dotted line of the film contacting pawl in the drawing, and is operably connected to a pressure plate operating mechanism for releasing the film to permit feed movements;

Figure 2 is a side elevation, similar to Figure 1, illustrating the position of the parts at the bottom of the feed stroke when the film is fed in the direction of the full line arrow, and with the pressure plate open to permit such movement prior to spring return of the parts to the position of Figure 1; and Figure 3 is an enlarged fragmentary view illustrating the film engaging pawl structure.

In the illustrated embodiment of my invention the film 11, which preferably has a series of the usual sprocket holes 50 along at least one side thereof, is fed through a film gate that comprises a pair of flat glass plates 12 and 13 interposed in the projection light path of a conventional projector having the usual condenser lens assembly indicated at 14 for supplying light to the film gate and an objective lens assembly indicated at 15 for projecting the image on a suitable screen.

Plate 12 is rigidly mounted in the apparatus with its flat inner face parallel to the direction of motion of the film. Plate 13 is similar in construction to plate 12 but is rockably mounted at 16 on the upper end of a lever 17 which is pivoted at its lower end at 18 upon a suitable stationary part 19 of the projector. The purpose of pivot 18 is to permit lever 17 to rock plate 13 bodily away from the film to release it for movement by the feed device later to be described. The purpose of pivot 16, which is preferably a pair of frictional pivots at opposite sides of plate 13, is to provide a self-aligning action for plate 13 when it is swung clockwise into engagement with the film, so that it presents full surface engagement with the film and clamps it flat and tight against plate 12.

A compression spring 21, abutting against a stationary part 22 of the projector, normally urges lever 17 clockwise and thereby resiliently urges plate 13 toward plate 12 to resiliently grip the film at the film gate.

The reversible feed mechanism of the invention comprises a slide plate 23 slotted in vertical alignment at 24 and 25 to accommodate studs 26 and 27, respectively, which are rigidly mounted on a supporting flat guide wall in the body of the projector and have enlarged slide plate retainer heads at their outer ends, as illustrated in Figures 1 and 2, so that they provide a guide and retainer mounting for enabling plate 23 to slide back and forth in a direction parallel to the desired direction of movement of the film and parallel to the inner flat face of plate 12. The enlarged headed outer ends of the studs maintain plate 23 in position on the projector, plate 23 lying flat upon an inner flat wall of the projector over which it slides vertically and in which studs 26 and 27 are rigidly mounted. A suitable coiled tension spring 28 is connected to a rigid arm 29 of plate 23 at one end and anchored to a stationary part 31 of the projector, whereby spring 28 constantly urges plate 23 upward toward its position illustrated in Figure 1, excess upward movement being prevented by studs 26 and 27.

On the side towards the film, plate 23 is provided with a projection 32 on which a lever 33 is pivoted as at 34. A leaf spring 35, anchored at its lower end at 36 to plate 23 and bearing against a pin 37 rigid with lever 33, constantly urges lever 33 counterclockwise toward film 11.

At the upper end of lever 33, a reversible toothed pawl 38 is pivotally mounted on pin 39. Pawl 38 comprises two oppositely directed sharp teeth 40 and 41, either adapted to engage the sprocket holes in the film depending upon the direction of movement desired. Teeth 40 and 41 are preferably sharp for entering the sprocket holes in the film, and the pawl 38 is preferably formed with a straight camming surface 42 which is common to both teeth and is adapted to ride on the film surface during the non-feeding stroke of the slide feed mechanism.

Pawl 38 is formed on opposite sides of its pivot 39 with stop faces 42 and 43, and a tension spring 44 is eccentrically connected to pawl 38 at one end and anchored on lever 33 at the other end. A fixed stop 45 is provided on lever 33 adapted to be engaged by face 43 of pawl 38 when the pawl is in the full line position of Figure 3, and by face 42 of pawl 38 when the pawl is in the dotted line position of Figure 3. Spring 44 urges the pawl against the stop in either of these two positions.

Plate 23 is provided on the edge adjacent the film with a generally vertical cam comprising a straight low face 46, a straight high face 47, and a short inclined face 48 interconnecting them. This cam is adapted to be engaged by a free roller 49 idly rotatably mounted on the end of an arm 51 rigid with lever 17, whereby roller 49 is resiliently urged by spring 21 into engagement with the cam on the slide plate 23.

When slide plate 23 is moved downwardly from its upper limit position illustrated in Figure 1, where roller 49 is riding in the low face of the cam and the film gate is closed, to the lower limit position of Figure 2, roller 49 climbs face 48 to the high face 47 of the cam and thus causes lever 17 to rock counterclockwise. This accomplishes opening of the film gate.

Figure 1 illustrates the parts after a film has been threaded through the mechanism and just before it is desired to move it one frame downwardly. Pins 26 and 27 which provide a stop locating the uppermost position of plate 23 are so located in correlation with pawl 38 that the tooth 40 rests on the surface of the film between two sprocket holes 50, preferably near the uppermost of these two sprocket holes, when the parts are in the position of Figure 1 as illustrated. At this time roller 49 is disposed on face 48. Film feed is accomplished by pushing down on tab 29, or an extension thereof extending through a suitable slot in the exterior wall of the projector, against the tension of the spring 28. Tooth 40 slides downwardly along the surface of the film and enters the first sprocket hole 50 that it encounters since the lever 33 is resiliently urged against the film by spring 35. Further downward movement of plate 23 will result in corresponding downward movement of the film. The torque exerted on pawl 38 by resistance of the film is opposed by engagement of the pawl with stop 45 so that pawl 38 remains in the full line position. Also the torque exerted by the film moving operation on lever 33 is less than the strength of spring 35, so that pawl 38 remains pressed against the film during the film feed stroke.

During the period that tooth 40 is sliding on the film, the film remains stationary but is released from gripping engagement by plates 12 and 13. This is accomplished by the camming action of face 48 quickly acting through roller 49 to rock lever 17 counterclockwise to the position of Figure 2, thereby separating plates 12 and 13 before tooth 40 enters a sprocket hole and the film starts to move. This separated position of plates 12 and 13 is maintained during the entire down stroke of plate 23, by roller 49 riding the high face 47, as illustrated in Figure 2.

After plate 23 has reached its downward limit of stroke and is in the position illustrated in Figure 2, the operator releases the tab 29 and this permits spring 28 to return plate 23 upward to the position of Figure 1. During this return, the tooth 40 disengages itself from the sprocket holes of the film and the cam face 42 merely rides on the film surface without moving the film. During upward travel of plate 23, the film gate remains open all the while that roller 49 remains on face 47, but as soon as roller 49 descends face 48 to low face 46, which takes place at the conclusion of the return stroke of plate 23, lever 17 is permitted to rock clockwise under influence of spring 21 to thereby close the film gate and grip the film frictionally to hold it flat between plates 12 and 13 during projection. The parts are now again in the position of Figure 1 and ready for a new feed operation.

The above described operation takes place when it is desired to move a film from top to bottom in Figures 1 and 2. When it is desired to move the film in the opposite direction, it is necessary only to turn pawl 38 clockwise about 90° on its pivot from the full line position of Figures 1–3 to the dotted line position illustrated therein, wherein face 42 engages the stop 45 and the tooth 41 becomes engaged with the surface of the film. It will be seen that spring 35 always maintains the pawl pressed against the film.

In operation, when the pawl is in the dotted line position of Figures 1–3, on the down stroke of plate 23, cam surface 42 simply rides over the film without feeding the film as it did during the upstroke when the film was fed in the opposite direction. Thus during the entire down stroke of plate 23, there is no film feed although when the roller 49 is cammed up onto face 47 plate 13 is rocked out of engagement with the film and maintained there. When the tab 29 is released after completion of the down stroke, spring 28 pulls plate 23 up toward the position of Figure 1 and since pawl 38 is held against rotation by stop 45 it is on this up stroke that the film feed takes place in this condition of operation of the apparatus.

During the time that the film is being moved upwardly, roller 49 is riding on face 47 so that the plates 12 and 13 remain in the position of Figure 2 and the parts are so arranged and dimensioned that completion of the spring urged upward stroke is effected as near as possible to the time that roller 49 descends face 48 so that there will be no appreciable feed stroke of the film after the pressure plates clamp the film.

I have thus provided a reversible slide film feed which automatically opens the pressure plate whenever the film is being moved and closes it when a feed movement is accomplished in either direction of film movement.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a strip film handling apparatus, releasable means for holding a film against longitudinal movement, reciprocable film feed means reversible for selectively feeding said film in one direction or the other comprising a film feed member reciprocable longitudinally of the film operatively engaged with the film during feed stroke movement in the desired direction and inoperable to feed the film during its non-feed stroke and means for reversing said operative engagement of said member with the film to select the direction of film feed, and means comprising coacting means on said film feeding means and said releasable means for automatically releasing said releasable means during said feed stroke in either direction of film feed and for holding the film against longitudinal movement during said non-feed stroke in either direction.

2. In a film handling apparatus, a releasable film gate member adapted to hold a film stationary, a reciprocable member having a first part for operably engaging and feeding the film in one direction during a reciprocation cycle and a second part for operably engaging and feeding the film in the opposite direction during a reciprocation cycle, means for moving one or the other of said parts into operative engagement with said film for selecting the direction of film feed, and cooperating means on said film gate member and operated by the reciprocable member for opening the film gate to release the film during the period that the film is being fed regardless of the direction of feed of the film.

3. In a film handling apparatus, a film gate, means for holding the film against longitudinal movement at the film gate, a slidable member, a pawl on said slidable member adapted to engage the film for moving it in one direction during reciprocation of said member, means for reversing the pawl so as to feed the film in the other direction during reciprocation of said member, and means on said slidable member operably connected to said film holding means operative to effect opening of the film gate during said movement of the film in either direction.

4. The film handling apparatus defined in claim 3, wherein said film holding means comprises a pair of parallel transparent plates, one of which is stationary and the other of which is resiliently urged toward the first.

5. The film handling apparatus defined in claim 3, wherein said pawl is pivoted on said member and means is provided on said slidable member for locating said pawl in said reversed positions.

6. In the film handling apparatus defined in claim 3, said film feeding means comprising a member slidably mounted for reciprocation parallel to the direction of film feed, manual means for moving said member in one direction and resilient means for returning it, and cam means on said member operably connected to said film holding means.

7. In the film handling apparatus defined in claim 3, said film holding means comprising a pair of parallel plates, one of which is stationary and the other movable, a pivoted lever for mounting said other plate, spring-urged means to bring said plates together, and a cam operated by said film feeding means operably connected to said lever.

8. In a strip film handling apparatus, releasable means for holding a film against longitudinal movement, reciprocable film feed means reversible for selectively feeding said film in one direction or the other comprising a film feed member reciprocable longitudinally of the film operatively engaged with the film during feed stroke movement in the desired direction and inoperable to feed the film during its non-feed stroke and means for reversing said operative engagement of said member with the film to select the direction of film feed, and means comprising cam means on said reciprocable feed member and an associated cam follower connected to said film holding means for automatically releasing said releasable means during said feed stroke in either direction of film feed and for holding the film against longitudinal movement during said non-feed stroke in either direction.

JAN A. VAN den BROEK.

REFERENCES CITED

The following references are of record in the file of this patent:

UNITED STATES PATENTS

| Number | Name | Date |
|---|---|---|
| 1,560,908 | Garbutt et al. | Nov. 10, 1925 |
| 1,879,844 | Debrie | Sept. 27, 1932 |
| 1,944,500 | De La Garde | Jan. 23, 1934 |
| 2,019,261 | Howell | Oct. 29, 1935 |
| 2,115,014 | Draeger | Apr. 26, 1938 |
| 2,165,419 | Schubert | July 11, 1939 |
| 2,213,746 | Schubert | Sept. 3, 1940 |
| 2,280,737 | Alburger | Apr. 21, 1942 |
| 2,330,709 | Harper et al. | Sept. 28, 1943 |
| 2,427,294 | McNabb | Sept. 9, 1947 |

FOREIGN PATENTS

| Number | Country | Date |
|---|---|---|
| 381,621 | Great Britain | Oct. 13, 1932 |